(12) United States Patent
Takase et al.

(10) Patent No.: US 6,959,004 B2
(45) Date of Patent: Oct. 25, 2005

(54) DATA DRIVEN INFORMATION PROCESSING APPARATUS

(75) Inventors: Motoki Takase, Yamatokoriyama (JP); Tsuyoshi Muramatsu, Nara (JP); Kazuya Arakawa, Yaita (JP)

(73) Assignee: Sharp Kabushiki Kaisha, Osaka (JP)

( * ) Notice: Subject to any disclaimer, the term of this patent is extended or adjusted under 35 U.S.C. 154(b) by 856 days.

(21) Appl. No.: 09/814,773

(22) Filed: Mar. 23, 2001

(65) Prior Publication Data

US 2001/0024448 A1 Sep. 27, 2001

(30) Foreign Application Priority Data

Mar. 24, 2000 (JP) .............................. 2000-083345

(51) Int. Cl.[7] .............................................. H04L 12/54
(52) U.S. Cl. ...................................... 370/428; 712/25
(58) Field of Search .............................. 370/428, 351, 370/360, 363, 366, 367, 368, 371, 373, 374, 370/377, 379, 382, 383, 384, 385, 386, 230, 370/231, 235, 236, 60, 112; 340/825.57

(56) References Cited

U.S. PATENT DOCUMENTS

| | | | | |
|---|---|---|---|---|
| 4,445,177 A | * | 4/1984 | Bratt et al. | 712/245 |
| 4,455,602 A | * | 6/1984 | Baxter et al. | 710/5 |
| 4,493,027 A | * | 1/1985 | Katz et al. | 712/228 |
| 4,525,780 A | * | 6/1985 | Bratt et al. | 711/163 |
| 5,400,331 A | * | 3/1995 | Lucak et al. | 370/401 |
| 5,404,553 A | * | 4/1995 | Komori et al. | 712/25 |
| 5,493,571 A | * | 2/1996 | Engdahl et al. | 370/514 |
| 5,502,720 A | * | 3/1996 | Muramatsu | 370/412 |
| 5,537,549 A | * | 7/1996 | Gee et al. | 709/224 |
| 5,553,095 A | * | 9/1996 | Engdahl et al. | 375/222 |
| 5,666,535 A | * | 9/1997 | Komori et al. | 718/104 |
| 5,689,647 A | * | 11/1997 | Miura | 712/11 |
| 5,926,643 A | * | 7/1999 | Miura | 712/7 |

FOREIGN PATENT DOCUMENTS

| JP | A5151370 | 6/1993 |
|---|---|---|
| JP | A683731 | 3/1994 |

* cited by examiner

*Primary Examiner*—Wellington Chin
*Assistant Examiner*—Jamal A. Fox
(74) *Attorney, Agent, or Firm*—Birch Stewart Kolasch & Birch LLP (57) ABSTRACT

A data packet, having a flag for determination of its processing content, a tag field and a data field, is sequentially transferred between pipeline registers according to pulses from C elements. A determination is made as to whether the tag field of the data packet includes information identical to that pre-stored in a tag field of a register within a processing content determination unit. Based on the determination result, the data packet is processed according to the information stored in a processing content determination field of the register.

18 Claims, 10 Drawing Sheets

DATA DRIVEN INFORMATION PROCESSING APPARATUS

BACKGROUND OF THE INVENTION

1. Field of the Invention

The present invention relates to data driven information processing apparatuses. More particularly, the present invention relates to a data driven information processing apparatus improved in program executing efficiency by multiple output instructions employing a self-synchronous transfer control circuit that enables transfer of a plurality of pulses from one pulse.

2. Description of the Background Art

In accordance with advances of multimedia in recent years, image processing, for example, requires a considerable amount of operations. As an apparatus for processing such a large amount of operations at high speed, a data driven information processing apparatus (hereinafter, referred to as a "data driven processor") has been proposed. In the data driven processor, processing proceeds according to a rule in that certain processing is performed once all the input data necessary for the processing becomes ready and resources, such as an operation device, necessary for the processing are assigned. As a device for data processing including an information processing operation of the data driven type, a data transmission device employing asynchronous handshaking is utilized. In such a data transmission device, a plurality of data transmission paths are connected with each other, which transmit therebetween a data transfer request signal (hereinafter, also referred to as a "SEND" signal) and a transfer enabling signal (hereinafter also referred to as an "ACK" signal) indicating whether the data transfer is permitted, to realize autonomous data transfer.

Figure 8:
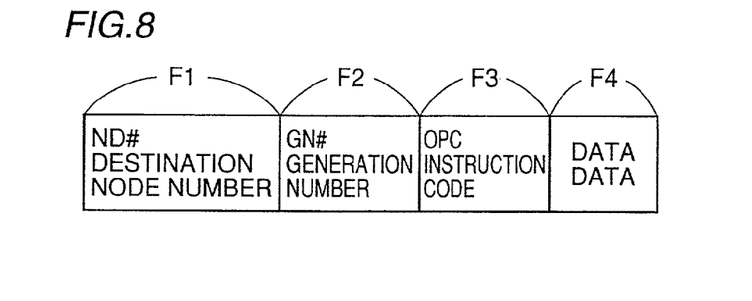
FIG. 8 is a diagram showing a format of a data packet employed in the prior art and the embodiments of the present invention.

FIG. 8 is a diagram showing a format of data packet to which both a conventional technique and the present invention are applied. Referring to FIG. 8, the data packet includes: a destination node number field F1 for storing a destination node number ND#; a generation number field F2 for storing a generation number GN#; an instruction code field F3 for storing an instruction code OPC; and a data field F4 for storing data DATA. Herein, the generation number is a number used to distinguish data to be processed in parallel from each other. The destination node number is a number used to distinguish input data within the same generation from each other. The instruction code is used to cause an instruction stored in an instruction decoder to be carried out.

Figure 9:
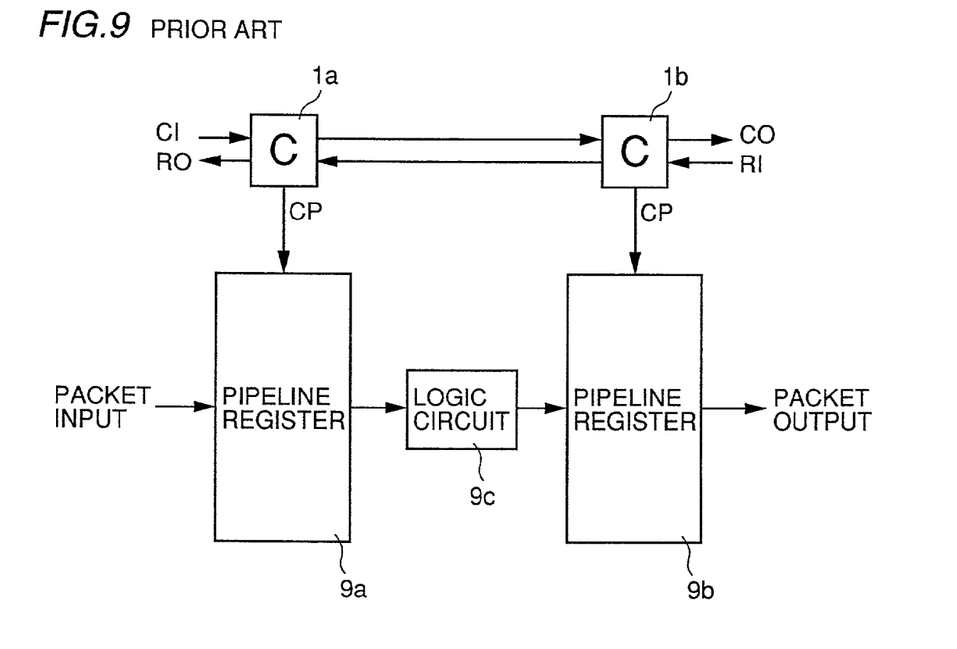
FIG. 9 is a block diagram showing an example of a conventional data transmission device employing handshaking.

FIG. 9 is a block diagram showing an example of a conventional data transmission device employing handshaking. Referring to FIG. 9, packet data input is sequentially processed by a logic circuit 9c while being transferred in sequence from a pipeline register 9a to another pipeline register 9b controlled by C elements 1a and 1b, respectively. In FIG. 9, at a time when pipeline register 9a is in a data retaining state, if the subsequent pipeline register 9b is also in the data retaining state, then data is not transferred from pipeline register 9a to pipeline register 9b.

On the other hand, if the subsequent pipeline register 9b is not in the data retaining state or if it enters the state not retaining data, then data is transmitted from pipeline register 9a to logic circuit 9c and processed there before being transmitted to pipeline register 9b, taking at least a prescribed delay time. This kind of control, in which data is transmitted asynchronously between neighboring pipeline registers, according to SEND signals input/output via their CI and CO terminals and ACK signals input/output via their RI and RO terminals and taking at least a prescribed delay time, is called a self-synchronous transfer control, and a circuit controlling such data transfer is called a self-synchronous transfer control circuit.

Figures 10A, 10E:
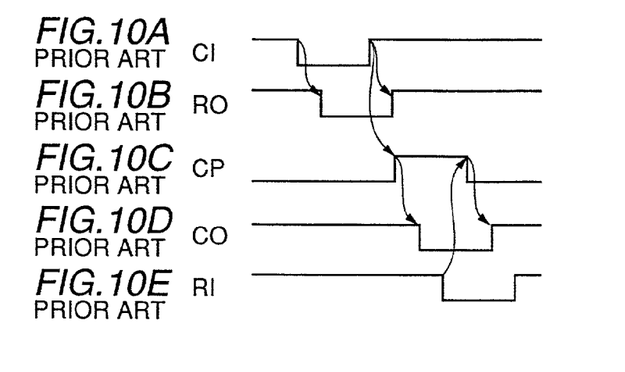

FIGS. 10A–10E are timing charts illustrating operations of the C elements shown in FIG. 9. C element 1a receives, from the terminal CI, a pulse of an L level shown in FIG. 10A. If the transfer enabling signal (ACK) received at the terminal RI is in a state permitting the data transfer as shown in FIG. 10E, C element 1a outputs a pulse shown in FIG. 10D from the terminal CO and also outputs a pulse shown in FIG. 10C to pipeline register 9a. In response to the pulse applied from C element 1a, pipeline register 9a retains the received input packet data, and outputs the retained data as output packet data. Further, C element 1a outputs a pulse shown in FIG. 10B to its preceding stage.

Figure 11:
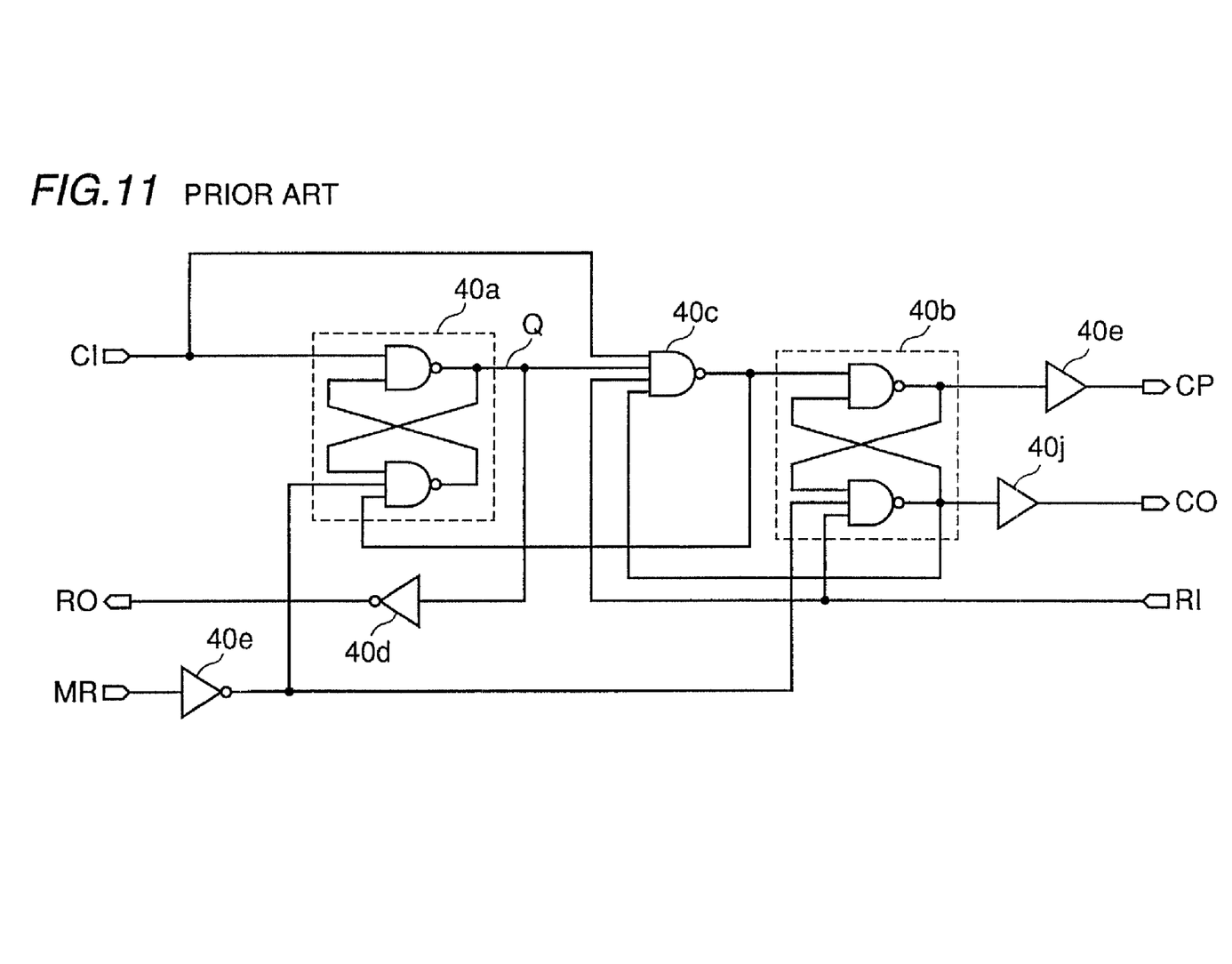
FIG. 11 is a specific circuit diagram of the C element shown in FIG. 9.

FIG. 11 is a circuit diagram specifically showing a self-synchronous transfer control circuit. This kind of self-synchronous transfer control circuit is described, e.g., in Japanese Patent Laying-Open No. 6-83731. Referring to FIG. 11, a pulse input terminal CI receives, from its preceding unit, a SEND signal (transfer request signal) in a pulse form. A transfer enabling output terminal RO outputs an ACK signal (transfer enabling signal) to the preceding unit. A pulse output terminal CO outputs the SEND signal in a pulse form to its subsequent unit, and a transfer enabling input terminal RI receives the ACK signal from the subsequent unit.

A master reset input terminal MR receives a master reset signal. When a pulse of an H level is applied to master reset input terminal MR (not shown in FIG. 9), it is inverted by an inverter 40e, and the inverted signal resets flip-flops 40a and 40b to initialize the C element. Pulse output terminal CO and transfer enabling output terminal RO each output a signal of an H level as its initialized state. The output of transfer enabling output terminal RO at an H level means that it permits data transfer, while the output at an L level means that it prohibits the data transfer. Further, the output of pulse output terminal CO at an H level means that it is not requesting data transfer to the subsequent stage, whereas the output at an L level means that it requests the data transfer, or data is now being transferred, to the subsequent stage.

When a signal of an L level is input to pulse input terminal CI, i.e., when the preceding stage requests the data transfer, flip-flop 40a is set and outputs a signal of an H level from its output Q. This H-level signal is inverted by inverter 40d, and a signal of an L level is output from transfer enabling output terminal RO, thereby prohibiting further data transfer. After a certain period of time, a signal of an H level is input to pulse input terminal CI, and setting of data from the preceding unit to the relevant C element is terminated. In this state, if a signal of an H level is being input from transfer enabling input terminal RI, indicating that the subsequent unit is permitting the data transfer, and also if a signal of an H level is being output from pulse output terminal CO, indicating that data is not being transferred to the subsequent unit (or it is not requesting data transfer to the subsequent unit), then a NAND gate 40c becomes active and outputs a signal of an L level.

As a result, flip-flops 40a and 40b are both reset. Flip-flop 40b outputs a signal of an H level, via a delay element 40e, from a pulse output terminal CP to the corresponding pipeline register. It also outputs the SEND signal of an L level, via a delay element 40j, from pulse output terminal CO to the subsequent C element, requesting data transfer to the subsequent unit. The subsequent C element, in response to reception of this SEND signal of the L level, outputs from its RO terminal the ACK signal of an L level to prohibit further data transfer thereto. The C element receives this ACK signal of the L level from transfer enabling input terminal RI. This signal causes flip-flop 40b to be set. As a result, a signal of an L level is output, via delay element 40e, from pulse output terminal CP to the pipeline register, and the SEND signal of an H level is output, via delay element 40j, from pulse output terminal CO to the subsequent unit. Thus, the data transfer is terminated.

Figure 12:
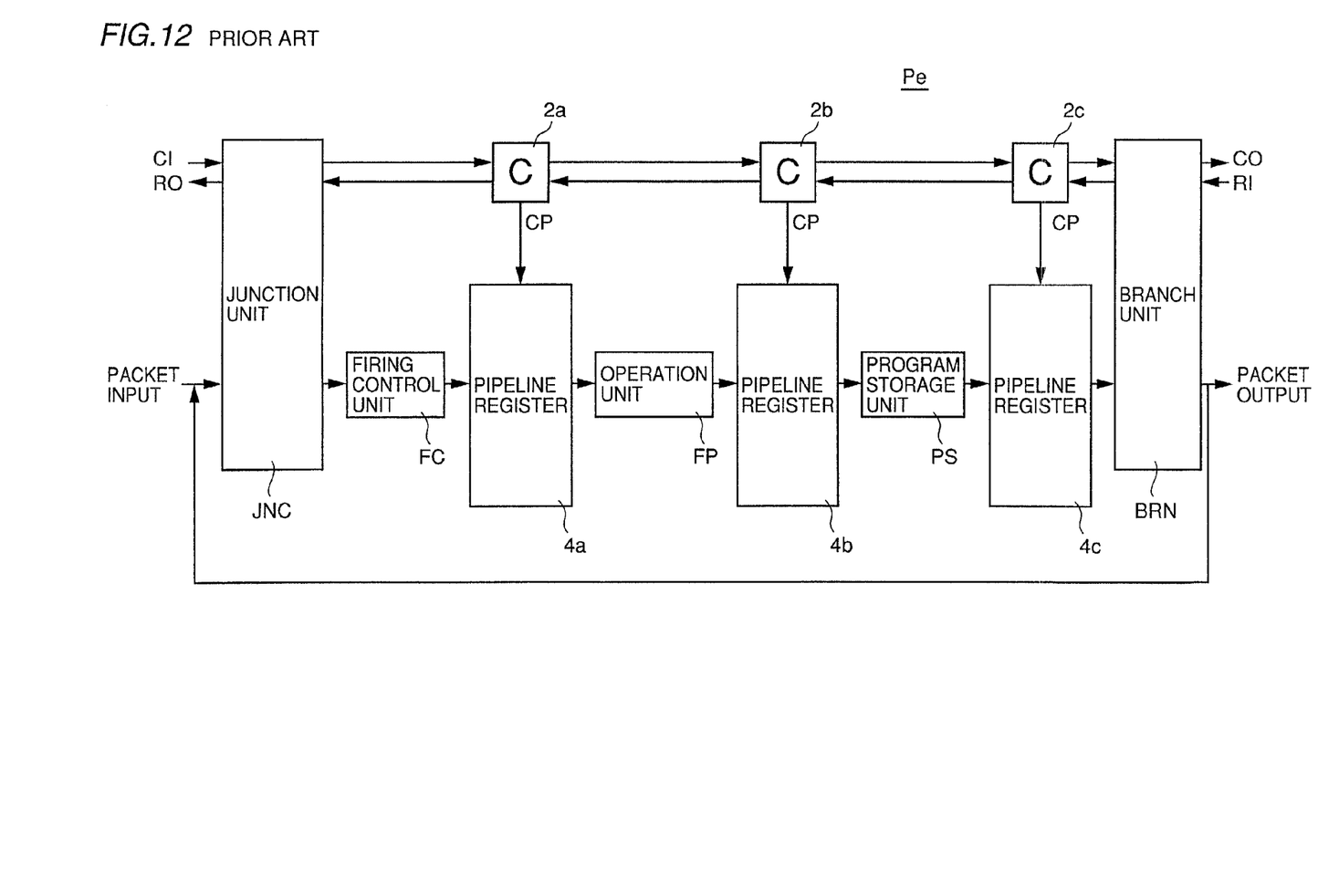
FIG. 12 is a block diagram of a conventional data driven information processing apparatus.

FIG. 12 is a schematic block diagram showing a conventional data driven processor incorporating the data transfer control circuit shown in FIG. 11. Referring to FIG. 12, the data driven processor Pe includes a junction unit JNC, a firing control unit FC, an operation unit FP, a program storage unit PS, a branch unit BRN, a plurality of pipeline registers 4a–4c, and a plurality of C elements 2a–2c. C elements 2a–2c each control packet transfer for its corresponding processing unit (FC, FP or PS) by sending/receiving packet transfer pulses (signals on CI, CO, RI, RO) to/from the preceding and subsequent C elements. Each pipeline register 4a–4c, in response to a pulse input from its corresponding C element 2a–2c, takes in and retains data received from the preceding processing unit, and delivers the data to its output stage. The data is retained until arrival of a next pulse.

Referring to FIG. 12, assume that processor Pe receives a data packet as shown in FIG. 8. The input packet is first passed through junction unit JNC to firing control unit FC, and paired data is formed with packets based on their destination node numbers ND# and generation numbers GN#. More specifically, two data packets with the same node number ND# and generation number GN# but having different data are detected, the data in one of the two data packets is additionally stored in the data field F4 (FIG. 8) of the other data packet, and the resultant other data packet is output. This data packet having the paired data (a set of data) stored in its data field F4 is then transmitted to operation unit FP. Operation unit FP inputs the data packet transmitted, performs a prescribed operation on the content of the input packet based on the instruction code OPC within the input packet, and stores the operation result in data field F4 of the packet. This input packet is then transmitted to program storage unit PS.

Program storage unit PS inputs the data packet transmitted, and based on destination node number ND# of the input packet, reads out a higher level destination node number ND#, a higher level instruction code OPC and a copy flag CPY from a program memory stored within program storage unit PS. The destination node number ND# and instruction code OPC thus read out are stored respectively in destination node number field F1 and instruction code field F3 of the input packet. Further, if the copy flag CPY read out is "1", it is determined that a higher level address within the program memory is also valid, and thus, a packet storing destination node number ND# and instruction code OPC stored in the higher level address is also generated.

The packet output from program storage unit PS is transmitted to branch unit BRN, from which it is either output based on its destination node number ND# or returned into the processor again. If three copies of the identical data are required, the packet returned into the processor is subjected to a copying process. It means that, to make several copies of the identical data, the packet should be returned into the processor several times to repeat the copying process.

In the above-described data driven information processing apparatus, a debug device is desired, when the data flow program does not work as expected due to some failure, to efficiently discover a cause of error, which can be found at a hardware level of the apparatus itself, or at a software level of the data flow program being executed thereon.

Such debug device for a data driven information processing apparatus is disclosed, e.g., in Japanese Patent Laying-Open No. 5-151370 entitled "Data Driven Type Computer". The debug device disclosed therein is capable of locally suspending and then resuming execution of a data flow program at a node corresponding to a designated line of a source program in order to understand the execution state of the program.

This debug device utilizes program converting means for adding a NOP instruction (instructing to cycle performing no operation) to a node corresponding to an end point of each line of the source program, and when designated to stop the program at a line where the processing of the source program is desired to be stopped, it outputs the data flow program with the corresponding NOP instruction changed to an output instruction. The debug device is provided with a breaking function to temporarily stop the program at a designated point of the program, perform a certain operation (e.g., reading the content of the memory) on the data driven type computer, and restart the program from the stopped point. Thus, it is capable of acquiring state information within the data driven type computer (e.g., the content of the memory) at the stop of the program and resuming the execution of the program from the same state as the time of the stop.

To implement the debug function as described above, however, the NOP operations should be added to respective end points of all the lines within the source program. Consequently, a number of wasteful cyclic packets are generated corresponding to the number of NOP instructions added, which decreases the processing speed of the program. Furthermore, addition of a node corresponding to the NOP operation causes changes to occur in the order of arrival of the data packets at a queue space for firing control unit FC and in the degree of congestion of the data packets on a circular pipeline over time, thereby hindering reproduction of expected operations of the source program.

SUMMARY OF THE INVENTION

Based on the foregoing, a primary object of the present invention is to provide a data driven information processing apparatus having a function to acquire information about any intermediate result within a program, without affecting processing speed and reproducibility of the program.

According to an aspect of the present invention, a data driven information processing apparatus having a plurality of data transmission paths connected in series, which transmit therebetween a data transfer request signal and a data transfer enabling signal for transmission of a data packet, includes a register and a processing circuit. The register is formed with a processing content detection field for determination of a processing content for the data packet and a tag field. The processing circuit, when a data packet including a flag for determination of a processing content, a tag field and a data field is input to the data transmission path, determines whether the tag field of the register and the tag field of the data packet have identical information, and, based on the determination result, performs processing on the data packet according to the information stored in the processing content detection field of the register.

Thus, according to the present invention, it is possible to extract a designated intermediate result within a program to transfer to a host, without affecting the processing speed and reproducibility of the program. Accordingly, a data driven information processing apparatus provided with an effective debug function is accomplished.

According to another aspect of the present invention, a data driven information processing apparatus having a plurality of data transmission paths connected in series, which transmit therebetween a data transfer request signal and a data transfer enabling signal for transmission of a data packet, includes a first register, a second register and a processing circuit. The first register includes a processing content detection field for determination of a processing content for the data packet and a tag data field. The second register includes a processing content detection field for determination of a processing content for the data packet and a tag mask field. The processing circuit, when a data packet including a flag for determination of a processing content thereof, a tag field and a data field is input to the data transmission path, applies masking processing on tag data stored in the tag data field of the first register and on tag data stored in the tag field of the data packet both using tag mask data stored in the tag mask field of the second register, determines whether the tag field of the first register after masking and the tag field of the relevant data packet after masking have identical information, and, based on the determination result, performs processing on the data packet according to the information stored in the processing content detection fields of the first and second registers.

Thus, according to the present invention, matching of the tag information is conducted after masking processing, so that only the information necessary for the matching can be extracted. This allows acquisition of information about a plurality of data packets at one time. Accordingly, a data driven information processing apparatus provided with a more effective debug function is realized.

Preferably, the processing to be performed on the data packet according to the information stored in the processing content detection field in the register, or those fields in the first and second registers, includes a host transfer process for transferring the data packet to the outside.

Still preferably, the processing to be performed on the data packet according to the information stored in the processing content detection field in the register, or those fields in the first and second registers, includes the host transfer process for transferring the data packet to the outside and a normal transfer process for transferring the data packet based on the tag information.

Still preferably, the data driven information processing apparatus includes a self-synchronous transfer control circuit that generates two data packets with respect to one transfer request signal and outputs a manipulation signal for manipulation of their host transfer flags to identify the two data packets, so as to allow both the host transfer process for transfer of the data packet to the outside and the normal transfer process for transfer of the data packet based on the tag information.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 10A–10E are timing charts illustrating operations of the C elements shown in FIG. 9.

DESCRIPTION OF THE PREFERRED EMBODIMENTS

Figure 1:
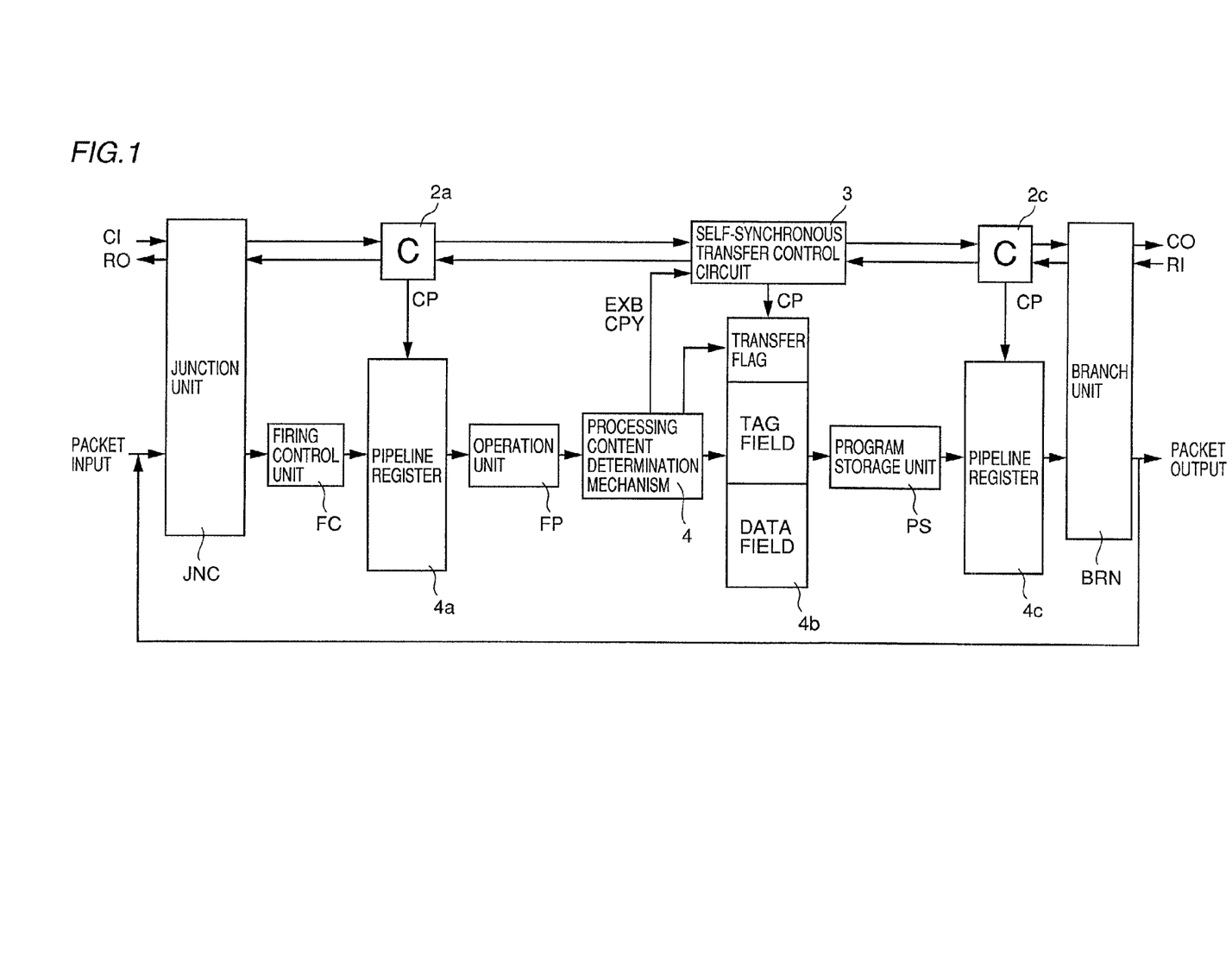
FIG. 1 is a schematic block diagram showing a data driven information processing apparatus according to a first embodiment of the present invention.

FIG. 1 is a block diagram showing a data driven information processing apparatus according to the first embodiment of the present invention. Referring to FIG. 1, this data driven information processing apparatus has a configuration similar to that shown in FIG. 12, except that a self-synchronous transfer control circuit 3 is provided instead of C element 2b in FIG. 12, and a processing content determination mechanism 4 is added between operation unit FP and pipeline register 4b. Processing content determination mechanism 4, upon receipt of a data packet from operation unit FP, performs matching with tag information stored in a preset tag field. Pipeline register 4b stores a transfer flag, a tag field and a data field.

It is understood that, in the following description, the term "tag field" refers to the fields other than data field F4 in the data packet configuration shown in FIG. 8. Specifically, it includes destination node number field F1, generation number field F2 and instruction code field F3.

Figure 2:
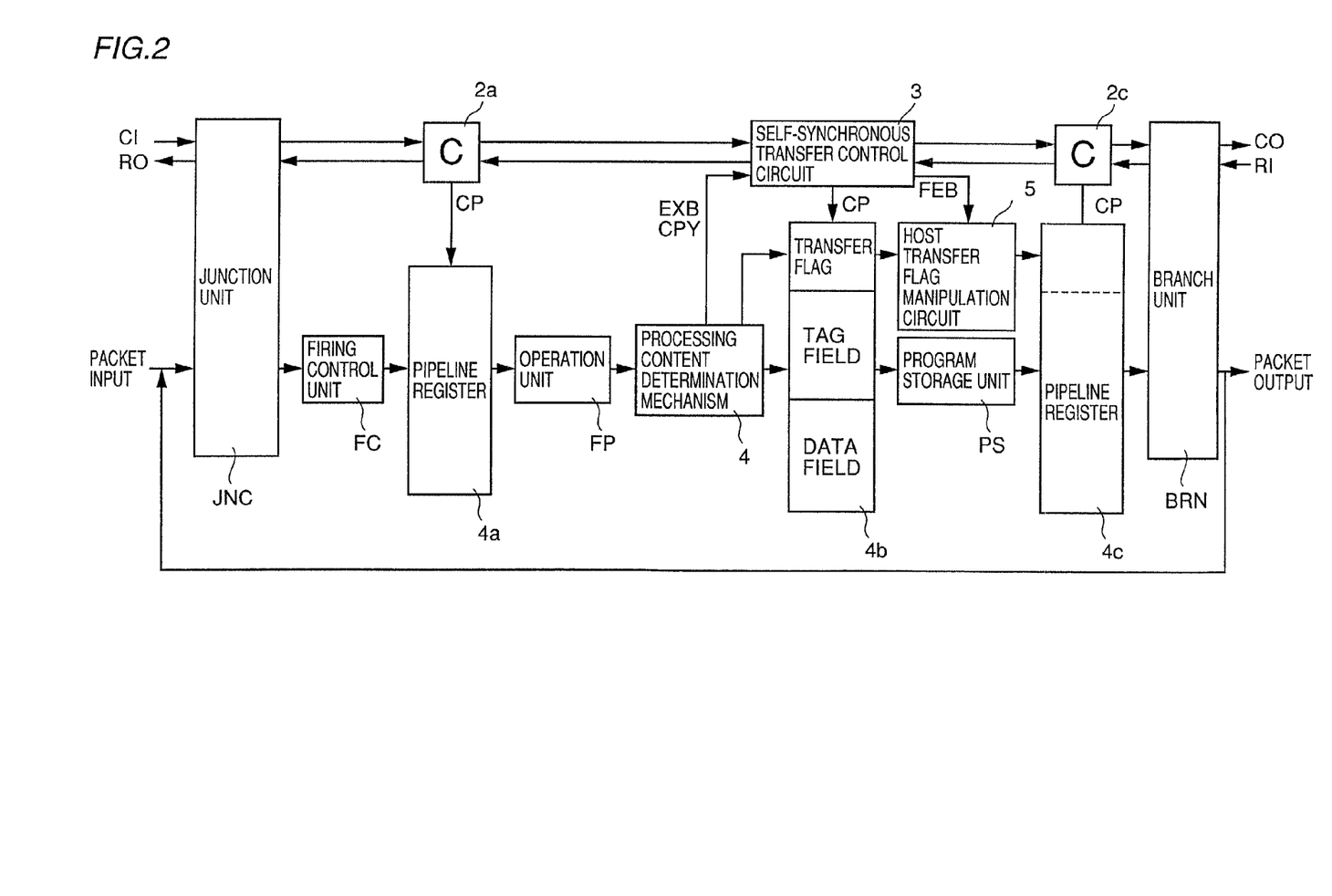
FIG. 2 is a block diagram of a data driven information processing apparatus according to a second embodiment of the present invention.

FIG. 2 is a block diagram showing the second embodiment of the present invention. The second embodiment shown in FIG. 2 is identical to the first embodiment shown in FIG. 1, except that a host transfer flag manipulation circuit 5 is provided between pipeline registers 4b and 4c. Host transfer flag manipulation circuit 5 has a function to change the host transfer flag based on a FEB signal from self-synchronous transfer control circuit 3.

Figure 3:
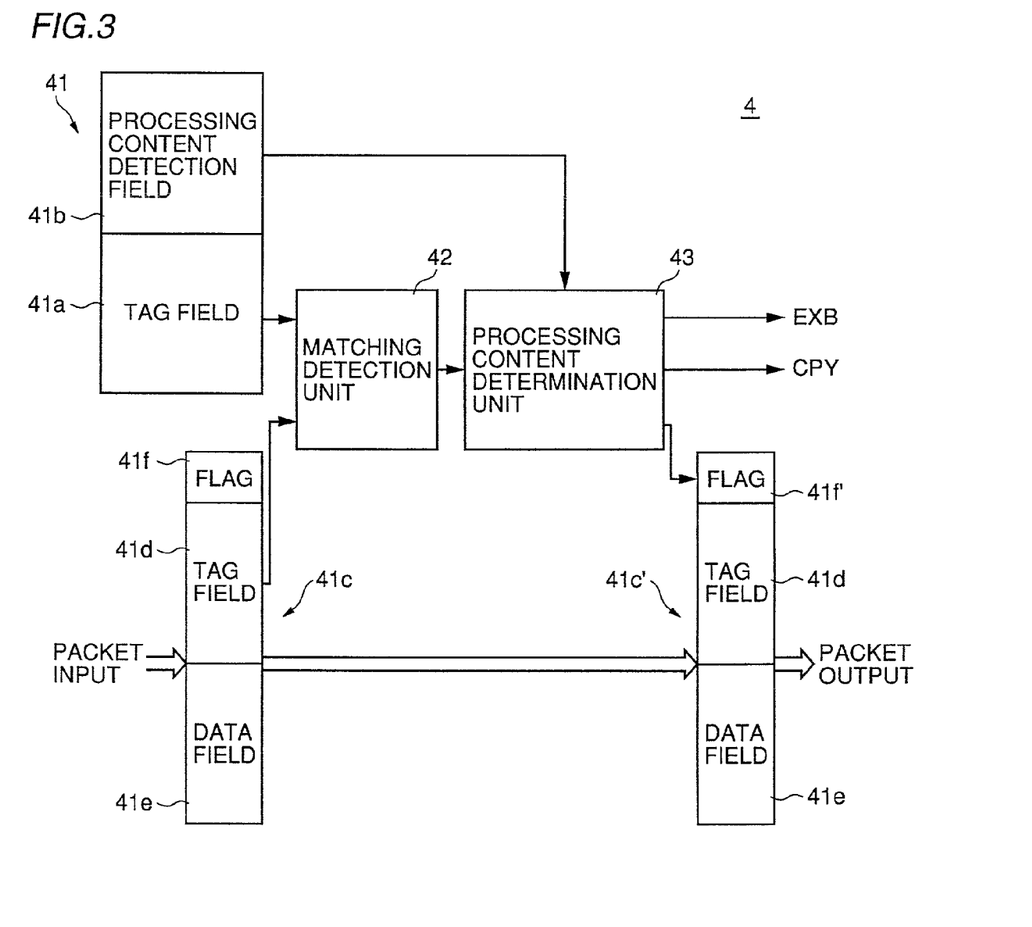
FIG. 3 is a specific block diagram of the processing content determination mechanism shown in FIGS. 1 and 2.

FIG. 3 is a specific block diagram of processing content determination mechanism 4 shown in FIGS. 1 and 2. Referring to FIG. 3, processing content determination mechanism 4 includes a set-up register 41, a matching detection unit 42, and a processing content determination unit 43. Set-up register 41 has a tag field 41a in which tag information of a data packet on which processing is to be performed is pre-stored by some means, e.g., by reading out the memory content or by inputting from an external terminal. Set-up register 41 also has a processing content detection field 41b in which information about a content of the processing that is to be performed on the data packet (e.g., host transfer, copying and erasing thereof) is pre-stored.

The data packet 41c output from operation unit FP shown in FIGS. 1 and 2 includes a tag field 41d, a data field 41e and a flag 41f. Flag 41f determines the processing content for this data packet 41c, regardless of the tag information stored in tag field 41d. Matching detection unit 42 detects whether the tag information included in tag field 41a pre-stored in set-up register 41 and the tag information included in tag field 41d of data packet 41c match with each other. If they match, matching detection unit 42 outputs a signal of an H level; otherwise it outputs a signal of an L level. The output of matching detection unit 42 is applied to processing content determination unit 43. Processing content determination unit 43 detects the processing content information included in processing content detection field 41b of set-up register 41 only when the signal of an H level is received from matching detection unit 42, and causes processing to be performed on data packet 41c according to the detected processing content information.

When matching detection unit 42 outputs the signal of an L level indicating mismatching between the tag information, data packet 41c is subjected to a normal operation. When matching detection unit 42 outputs the signal of an H level, indicating matching therebetween, to processing content determination unit 43, the processing content information stored in processing content detection field 41b of set-up register 41 is detected by processing content determination unit 43, and processing according to the detected information is performed on data packet 41c.

For example, new information is added to flag 41f included in data packet 41c, so that a new flag 41f is generated. Using tag field 41d and data field 41e of data packet 41c without alteration, a new data packet 41c' is generated, which is retained in pipeline register 4b shown in FIGS. 1 and 2. Processing content determination unit 43 also outputs control signals EXB and CPY to self-synchronous transfer control circuit 3 shown in FIGS. 1 and 2.

In the case where the information acquired by flag 41f' of new data packet 41c' shown in FIG. 3 is host transfer information, the data packet 41c' is forcibly transferred to the host, regardless of the tag information included in data packet 41c'. Herein, "host transfer" means that, if a plurality of data driven information processing apparatuses each having the configuration as shown in FIG. 1 are connected, the data packet is output from those apparatuses to the outside.

Figure 4:
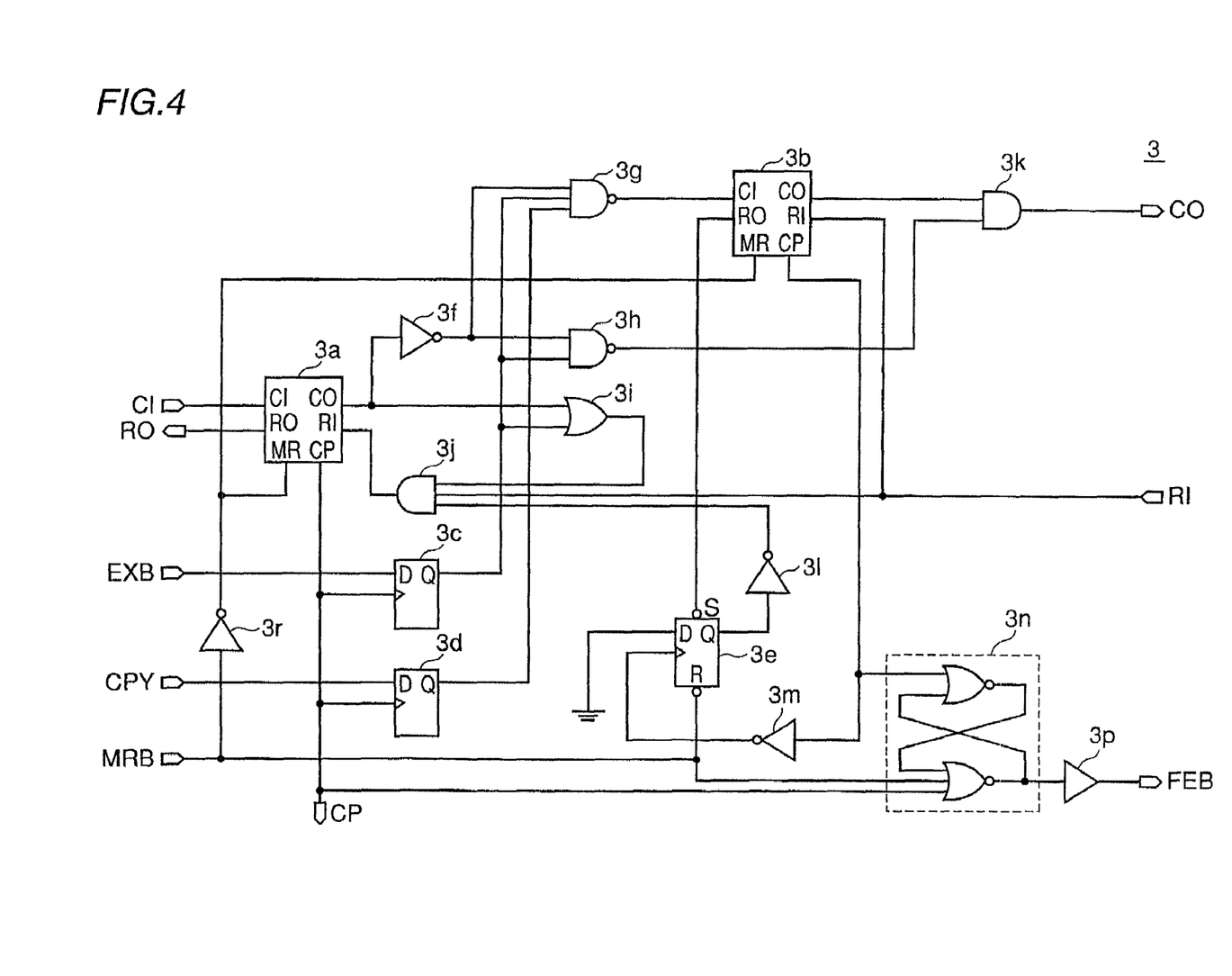
FIG. 4 is a specific circuit diagram of a self-synchronous transfer control circuit.

FIG. 4 is a circuit diagram showing a self-synchronous transfer control circuit 3 shown in FIGS. 1 and 2. Referring to FIG. 4, pulse input terminal CI receives a transfer request signal in a pulse form from the preceding unit, and transfer enabling output terminal RO outputs a transfer enabling signal to the preceding unit. Pulse output terminal CO outputs a transfer request signal in a pulse form to the subsequent unit, and transfer enabling input terminal RI receives a transfer enabling signal from the subsequent unit. Master reset input terminal MRB receives a master reset signal, EXB terminal receives a packet erasure signal, and CPY terminal receives a packet copy signal.

Further, self-synchronous transfer control circuit 3 includes C elements 3a, 3b, D type flip-flops 3c, 3d, 3e, NAND gates 3g, 3h, an OR gate 3i, AND gates 3j, 3k, inverters 3f, 3l, 3m, and a delay element 3p.

FIGS. 5A–5H are timing charts illustrating the operation of self-synchronous transfer control circuit 3 shown in FIG. 4.

Referring to the timing charts in FIGS. 5A–5H, a packet erasing operation, a packet normal transfer operation and a packet copying operation of the self-synchronous transfer control circuit of FIG. 4 will now be described in order.

Figure 5A:
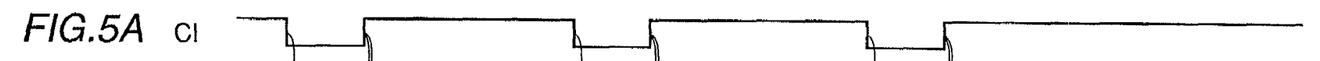
FIGS. 5A–5H are timing charts illustrating an operation of the self-synchronous transfer control circuit shown in FIG. 4.
Figure 5B:
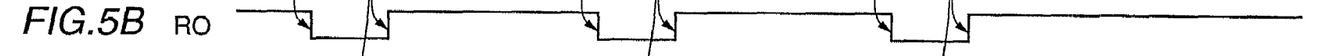

First, C elements 3a and 3b are each reset when a pulse of an H level is input from master reset terminal MR, and they each output a signal of an H level from both its pulse output terminal CO and its transfer enabling output terminal RO. Consequently, pulse output terminal CO and transfer enabling output terminal RO of self-synchronous transfer control circuit 3 both output a signal of an H level, as shown in FIGS. 5G and 5B, whereby the self-synchronous transfer control circuit 3 is initialized. Flip-flop 3n is also reset by the reset signal of an H level, and a signal of an L level shown in FIG. 5F is output, via delay element 3p, from the FEB terminal. Further, D type flip-flop 3e is asynchronously reset, and a signal of an L level is output from its Q output. This signal is inverted by inverter 3l, and a signal of an H level is input to 3-input AND gate 3j.

Figure 5C:
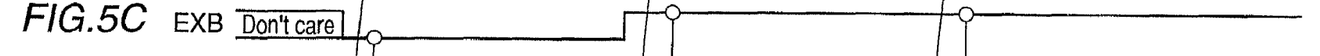
Figure 5D:
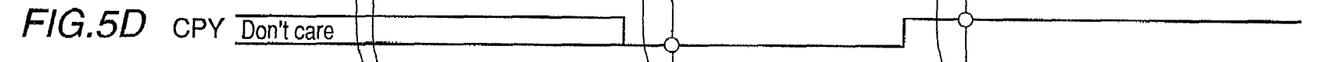
Figure 5E:
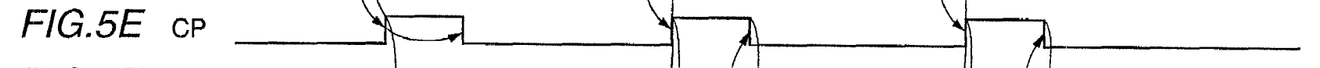
Figure 5F:
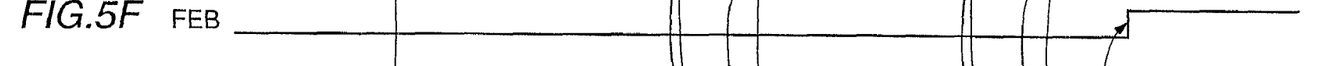
Figure 5G:
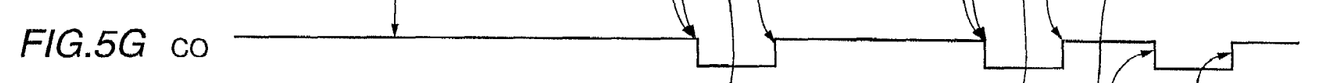

Self-synchronous transfer control circuit 3 performs the packet erasing operation when a signal of an L level shown in FIG. 5C is input to the EXB terminal. More specifically, during the state where a signal of an L level is being input to EXB terminal, if a pulse signal of an L level shown in FIG. 5A is input to pulse input terminal CI of self-synchronous transfer control circuit 3, then a pulse signal of an L level is input to pulse input terminal CI of C element 3a.

RI terminal is at an H level since master reset signal MR has been input, and thus, C element 3a performs a normal operation. When terminal CI is set to an H level after a certain period of time, C element 3a outputs a signal changing from an L level to an H level, from pulse output terminal CP to pipeline register 4b, as described above in the background art section. In synchronization with the rise of the signal output from output terminal CP, D type flip-flop 3c derives, from its output Q, the signal of an L level having been input from the EXB terminal. Thus, NAND gate 3h outputs a signal of an H level, setting the output of AND gate 3k to an H level.

Figure 5H:
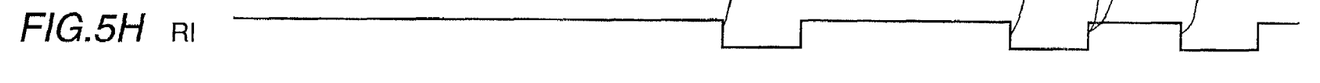

Since the signal of an L level is also input to OR gate 3i, the signal output from pulse output terminal CO of C element 3a becomes an output signal of OR gate 3i. Further, since a signal of an H level as shown in FIG. 5H has been applied to transfer enabling input terminal RI of self-synchronous transfer control circuit 3 as its initial state, the output signal of OR gate 3i is applied to AND gate 3j and output from AND gate 3j without alteration.

As a result, the signal output from pulse output terminal CO of C element 3a is input to transfer enabling input terminal RI of C element 3a without alteration.

As described above, since a signal of an L level is output from pulse output terminal CO of C element 3a, a signal of an L level is input to transfer enabling input terminal RI of C element 3a. Thus, the signal output from terminal CP of C element 3a changes from an H level to an L level. Further, the signal output from terminal CO of C element 3a changes from an L level to an H level, and this signal is input via OR gate 3i and AND gate 3j to the RI terminal of C element 3a. As the terminal CO of self-synchronous transfer circuit 3 is maintained at an H level, data transfer is not requested to the subsequent unit, whereas data is transferred from the preceding unit. Accordingly, the data packet having been transferred is erased by overwriting.

The packet erasing operation has been described in order to explain that the self-synchronous transfer control circuit of the present invention is capable of a series of operations including packet erasing, normal transfer and copying operations. However, this is irrelevant to the substance of this invention, i.e., the ability to acquire information about intermediate results.

The normal packet transfer operation of self-synchronous transfer control circuit 3 will now be described. During the state where a signal of an H level is being input from the EXB terminal and a signal of an L level is being input from the CPY terminal, if a pulse signal of an L level is input from pulse input terminal CI of self-synchronous transfer control circuit 3, then a pulse signal of an L level is input to pulse input terminal CI of C element 3a. After a certain period of time, input terminal CI is set to an H level. In this case, C element 3a performs an operation as in the conventional case, where a signal changing from an H level to an L level is output from pulse output terminal CO of C element 3a, and a signal changing from an L level to an H level is output from pulse output terminal CP to the pipeline register.

In response to the rise of the signal output from CP terminal, D type flip-flop 3c, having been set to an H level prior to the rise of the signal at terminal CP of self-synchronous transfer control circuit 3, derives from its output Q the signal of the H level having been input from EXB terminal. Similarly, D type flip-flop 3d derives from its output Q the signal of the L level, shown in FIG. 5D, having been input from CPY terminal.

The signal of the L level output from D type flip-flop 3d is applied to NAND gate 3g, setting the output of NAND gate 3g to an H level. This H-level signal is continuously applied to pulse input terminal CI of C element 3b, and therefore, C element 3b does not operate in this mode.

The signal of the H level output from D type flip-flop 3c is applied to NAND gate 3h, and thus, NAND gate 3h outputs an inverted signal of the signal output from inverter 3f, i.e., the same signal as output from CO terminal of C element 3a.

Since CO terminal of C element 3b has been set to an H level, the signal output from NAND gate 3h is applied to NAND gate 3k, and then output from NAND gate 3k without alteration. In other words, the same signal as the output signal of CO terminal of C element 3a is output from CO terminal of self-synchronous transfer control circuit 3. The output signal of the H level of D type flip-flop 3c is input to OR gate 3i, and thus, the output of OR gate 3i is fixed to an H level. Since the output of inverter 3l is at an H level, AND gate 3j comes to output the same signal as that input from RI terminal of self-synchronous transfer control circuit 3.

More specifically, the same signal as the one input from RI terminal of self-synchronous transfer control circuit 3 is input to RI terminal of C element 3a. When the signal output from CP terminal of C element 3a (the same as CP terminal of self-synchronous transfer control circuit 3) changes from an L level to an H level, C element 3a operates correspondingly, and therefore, the signal output from its CO terminal changes from an H level to an L level. Accordingly, the signal output from CO terminal of self-synchronous transfer control circuit 3 changes from an H level to an L level.

After a certain period of time, the signal input from RI terminal of self-synchronous transfer control circuit 3 changes from an H level to an L level, and thus, the signal input to RI terminal of C element 3a changes from an H level to an L level. In response thereto, the signal output from CP terminal of C element 3a changes from an H level to an L level, and the signal output from CO terminal of C element 3a changes from an L level to an H level. This means that the signal output from CO terminal of self-synchronous transfer control circuit 3 changes from an L level to an H level. After a certain period of time, a signal of an H level is input from RI terminal of self-synchronous transfer control circuit 3, whereby the normal packet transfer operation of self-synchronous transfer control circuit 3 is terminated.

Finally, the packet copying operation of self-synchronous transfer control circuit 3 will be described. During the state where a signal of an H level is being input from EXB terminal and a signal of an H level is being input from CPY terminal, if a pulse signal changing from an H level to an L level is input to pulse input terminal CI of self-synchronous transfer control circuit 3, then a pulse signal of an L level is input to pulse input terminal CI of C element 3a. When it changes from the L level to an H level after a certain period of time, C element 3a correspondingly operates as in the conventional case, where a signal changing from an H level to an L level is output from pulse output terminal CO of C element 3a, and a signal changing from an L level to an H level is output from pulse output terminal CP to the pipeline register. In response to the rise of the signal from output terminal CP, D type flip-flop 3c derives from its output Q the signal of the H level having been input from EXB terminal, and D type flip-flop 3d derives from its output Q the signal of the H level having been input from CPY terminal.

The output of CO terminal of C element 3a changes from an H level to an L level. This L-level signal is applied to inverter 3f and inverted to an H level, which is then applied to NAND gate 3h. As D type flip-flop 3c outputs a signal of an H level from its output Q, the output of NAND gate 3h attains an L level. This L-level signal is applied to AND gate 3k, so that AND gate 3k outputs a signal of an L level. This means that a signal of an L level is output from CO terminal of self-synchronous transfer control circuit 3.

After a certain period of time, a signal of an L level is input from RI terminal of self-synchronous transfer control circuit 3. Since the H-level signal output from inverter 3f described above is also applied to NAND gate 3g, and since D type flip-flops 3c and 3d both output a signal of an H level, the output of NAND gate 3g attains an L level. This L-level signal is input to pulse input terminal CI of C element 3b, so that a signal of an L level is output from transfer enabling output terminal RO of C element 3b. Since D type flip-flop 3e is set asynchronously, the output terminal Q of D type flip-flop 3e changes from an L level to an H level. This H-level signal is inverted by inverter 3l, and its output signal of an L level is applied to AND gate 3j.

AND gate 3j outputs a signal of an L level, which is applied to RI terminal of C element 3a. Thus, the signal output from CP terminal of C element 3a changes from an H level to an L level, and the signal output from CO terminal of C element 3a changes from an L level to an H level. The signal of an H level input from RI terminal of self-synchronous transfer control circuit 3 changes to an L level, which is applied to RI terminal of C element 3b, and the signal output from CO terminal of C element 3b changes from an L level to an H level. Since the signal output from CO terminal of C element 3a changes from an L level to an H level, a signal changing from an L level to an H level is output, via inverter 3f, NAND gate 3h and AND gate 3k, to CO terminal of self-synchronous transfer control circuit 3. After a certain period of time, a signal of an H level is input to RI terminal of self-synchronous transfer control circuit 3, so that transfer of the first packet is terminated.

When the signal output from CO terminal of C element 3a changes from an L level to an H Level, the signal input via inverter 3f and NAND gate 3g to CI terminal of C element 3b comes to change from an L level to an H Level. At the rise of the signal at CI terminal of C element 3b, the signals output from CO and RI terminals of C element 3b are both at an H level. Therefore, C element 3b outputs from CP terminal a signal changing from an L level to an H level, and outputs from CO terminal a signal changing from an H level to an L level. The H-level signal output from CP terminal of C element 3b sets flip-flop 3n, so that a signal of an H level is output, via delay element 3p, from FEB terminal of self-synchronous transfer control circuit 3. Thereafter, CI terminal of C element 3b is fixed to an H level, so that C element 3b no longer performs the pulse output operation. At this time, C element 3b enters a state in which it outputs a signal of an H level from its CP terminal and a signal of an L level from its CO terminal. This corresponds to a state in which self-synchronous transfer control circuit 3 outputs a signal of an L level from its CO terminal for transfer of the second, copy packet.

After a certain period of time, a signal of an L level is input to RI terminal of self-synchronous transfer control circuit 3. Thus, a signal of an L level is input to RI terminal of C element 3b. In response thereto, C element 3b causes the signal output from its CP terminal to change from an H level to an L level, and the signal output from its CO terminal to change from an L level to an H level. Accordingly, a signal changing from an L level to an H level is output from CO terminal of self-synchronous transfer control circuit 3.

In response to the fall of the signal at CP terminal of C element 3b, a clock signal is input, via inverter 3m, to D type flip-flop 3e. D type flip-flop 3e, with its D input at an L level, outputs a signal of an L level from its output terminal Q. This L-level signal is inverted by inverter 3l to an H level, and the H-level signal is applied to AND gate 3j. The output of AND gate 3j, having been fixed to an L level, now changes to a signal identical to that input from RI terminal of self-synchronous transfer control circuit 3. Since a signal of an H level is output from CO terminal of self-synchronous transfer control circuit 3, after a certain period of time, a signal changed from an L level to an H level is input from RI terminal thereof, indicating that the subsequent unit has completed the processing and entered a transfer enabling state. This input signal of an H level is input, via AND gate 3j, to RI terminal of C element 3a.

Accordingly, the copying operation of self-synchronous transfer control circuit 3 is terminated. As shown in FIG. 1, this self-synchronous transfer control circuit 3, when receiving one pulse from preceding C element 2a at its pulse input terminal CI, is capable of outputting one pulse from its CP terminal to pipeline register 4b and also outputting two pulses from its pulse output terminal CO to subsequent C element 2c.

Referring to FIGS. 1 and 2, data packet transfer to the host during the program processing is carried out in a state where self-synchronous transfer control circuit 3 is in a normal transfer mode, the EXB signal is set to an H level, the CPY signal is set to an L level, and the FEB signal is not in use. In this state, tag information of the data packet that is to be transferred to the host has been stored in tag field 41a included in set-up register 41 of processing content determination mechanism 4, and host transfer information has been pre-stored in processing content detection field 41b also included in the register 41.

When the tag information stored in set-up register 41 and that included in data packet 41c match with each other, host transfer information is added to the data packet 41c by, e.g., setting the flag to "1", so that the host transfer is realized. In other words, data packet 41c is forcibly output to the outside (to the host). The copying operation of the data packet during the program processing is performed as follows. As shown in FIG. 2, the tag information of the data packet to be copied is stored in tag field 41a included in set-up register 41 within processing content determination mechanism 4, and copying information is pre-stored in processing content detection field 41b also included in the register 4. If the two tag information match with each other and if copying of this data packet 41c is desired, then a signal of an H level is input to both CPY and EXB terminals of self-synchronous transfer control circuit 3 in the subsequent stage, whereby the copying operation is enabled. At this time, since the program is not changed, all that is needed is to change the setting of tag field 41a in set-up register 41. Accordingly, it is possible to perform processing on an operation result of data packet 41c as desired, without affecting the processing speed and reproducibility of the program.

When the copying operation is performed because of the matching of the tag information as described above, at the first packet transfer by the copying operation, manipulation of the host transfer flag is not performed as FEB signal is at an L level. Thus, a normal operation is carried out thereafter, according to the information included in tag field 41d of data packet 41c.

At the second packet transfer, however, FEB signal is at an H level, so that host transfer flag manipulation circuit 5 alters the host transfer flag. Accordingly, this data packet is forcibly transferred via branch unit BRN to the outside (to the host). This makes it possible to extract the information about the intermediate result without affecting the processing speed and reproducibility of the program.

Figure 6:
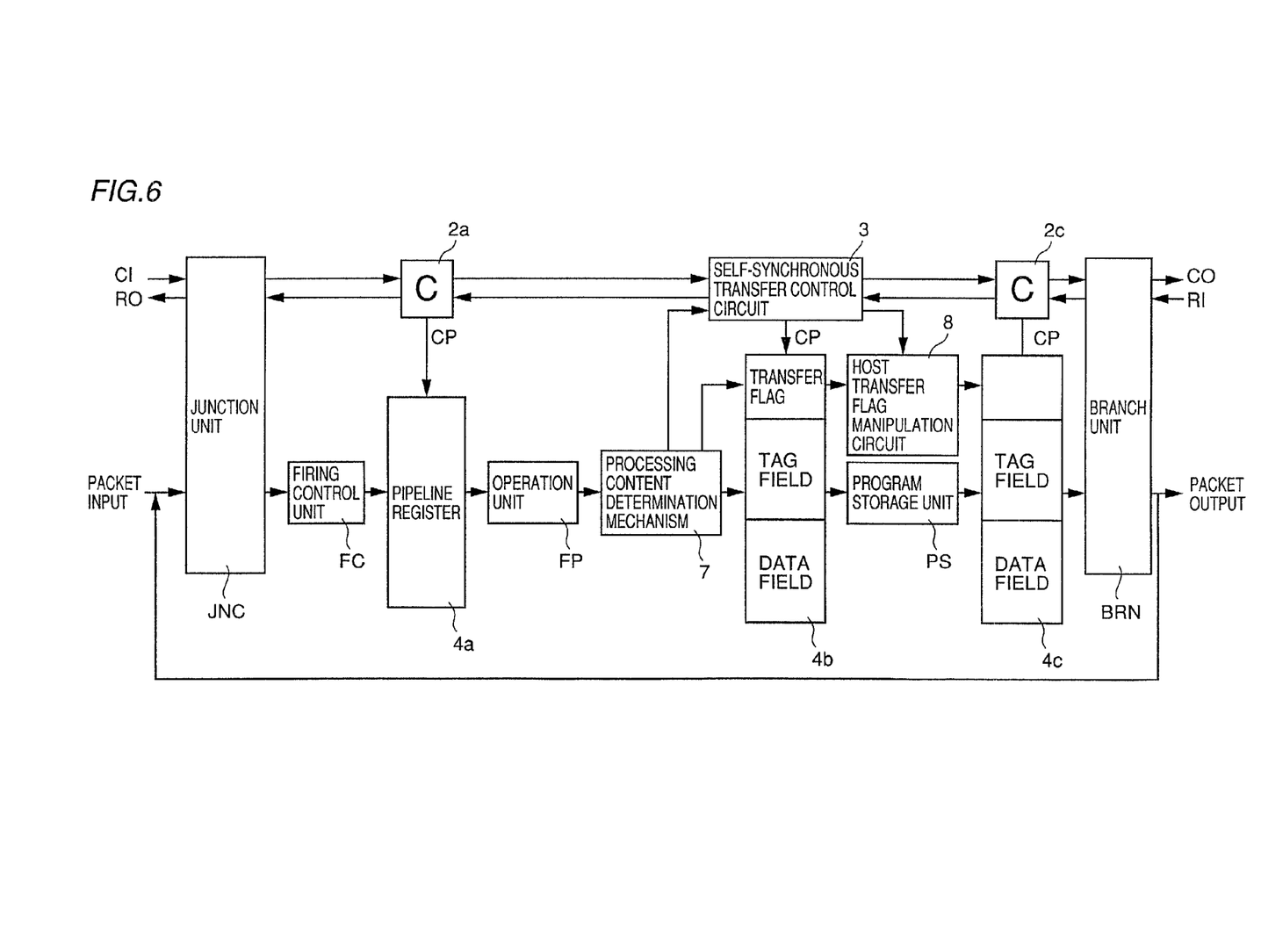
FIG. 6 is a block diagram of a data driven information processing apparatus according to a third embodiment of the present invention.
Figure 7:
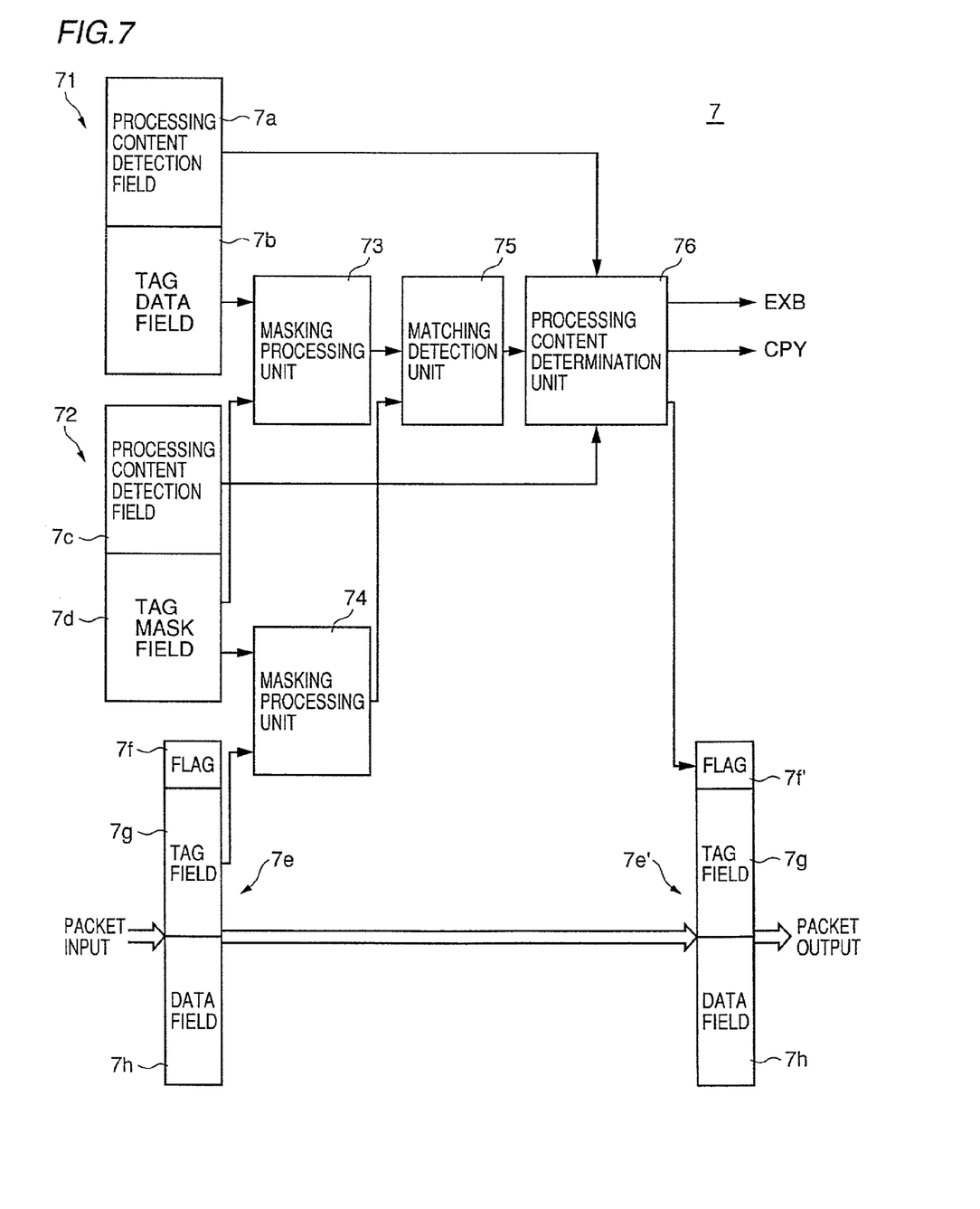
FIG. 7 is a specific block diagram of the processing content determination mechanism shown in FIG. 6.

FIG. 6 is a block diagram of a data driven information processing apparatus according to the third embodiment of the present invention. FIG. 7 is a specific block diagram of the processing content determination mechanism shown in FIG. 6.

Referring to FIG. 6, a processing content determination mechanism 7 as shown in FIG. 7 is provided between operation unit FP and pipeline register 4b, as in the embodiments shown in FIGS. 1 and 2. For every data packet having undergone the operation by operation unit FP, processing content determination mechanism 7 performs matching of tag information stored in the tag field of the relevant data packet and tag information included in set-up registers incorporated within the mechanism 7. Processing content determination mechanism 7 utilizes a first processing content detection field included in a first set-up register as a host transfer detection field for storing host transfer information, and a second processing content detection field included in a second set-up register as a copying detection field for storing copying information.

A detailed configuration of processing content determination mechanism 7 will now be described with reference to FIG. 7. Processing content determination mechanism 7 includes a first set-up register 71, a second set-up register 72, a first masking processing unit 73, a second masking processing unit 74, a matching detection unit 75, and a processing content determination unit 76. First set-up register 71 includes a processing content detection field 7a for designation of the processing content of data packet 7e and a tag data field 7b that corresponds to tag field 41a shown in FIG. 3. This set-up register 71 corresponds to set-up register 41 shown in FIG. 3. Second set-up register 72 includes a processing content detection field 7c and a tag mask field 7d. Data packet 7e has a flag 7f, a tag field 7g and a data field 7h, as in the data packet 41c shown in FIG. 3. Flag 7f determines the processing content for data packet 7e, regardless of the tag information included in tag field 7g.

Masking processing units 73 and 74 allow only the tag information necessary for matching to be output. Matching detection unit 75 outputs a signal of an H level only when the tag information included in tag data field 7b of first set-up register 71 after masking and that included in tag field 7g of data packet 7e after masking match with each other; otherwise, it outputs a signal of an L level. Processing content determination unit 76 detects the processing content information included in processing content detection fields 7a and 7c of respective set-up registers 71 and 72 only when a signal of an H level is output from matching detection unit 75. Processing is then performed on data packet 7e according to the detected processing content information.

In set-up registers 71 and 72, tag information of data packet 7e to be processed is stored in tag data field 7b by means of, e.g., reading out the memory content or inputting from an external terminal, as described above in conjunction with FIG. 3. Further, information for use in performing masking of information other than the tag information necessary for the matching is stored in tag mask field 7d, and information about the processing content that is desired to be done (e.g., host transfer, copying of the data packet) is pre-stored in processing content detection fields 7a and 7c. Masking processing units 73 and 74 apply masking processing on the tag information included in tag data field 7b of set-up register 71 and that included in tag field 7g of data packet 7e, to extract only information necessary for the matching (e.g., instruction codes only) using tag mask field 7d in set-up register 72.

Matching detection unit 75 then determines whether the tag information included in tag field 7g of data packet 7e after the masking processing and the tag information included in tag data field 7b of set-up register 71 after the masking processing match with each other. If they match, a signal of an H level is output from matching detection unit 75 to processing content determination unit 76. Correspondingly, the processing content information included in processing content detection fields 7a and 7c of set-up registers 71 and 72, respectively, are detected by processing content determination unit 76, and processing is performed on data packet 7e according to the detected information (which corresponds to the addition of information to flag 41f of data packet 41c in the case of FIG. 3).

Data packet 7e' having new information thus added thereto is processed according to the information included therein. On the contrary, if the tag information do not match with each other, a signal of an L level is output from matching detection unit 75 to processing content determination unit 76. In this case, a normal operation is applied to the data packet 7e.

As shown in FIGS. 6 and 7, tag information of a data packet that is desired to be transferred to the host is pre-stored in tag data field 7b included in set-up register 71 of processing content determination mechanism 7, and information for use in extracting only the information necessary for matching is pre-stored in tag mask field 7d included in set-up register 72 of the mechanism 7. If the tag information included in tag field 7g of data packet 7e after the masking matches the tag information included in tag data field 7b of set-up register 71 after the masking, then the host transfer information and the copying information are provided to self-synchronous transfer control circuit 3, so that data packet 7e is copied. The first packet thereof is subjected to a normal operation, and the second packet is transferred to the host. Detailed procedures for such packet transfer are as follows.

First, at the time when the tag information included in tag field 7g of data packet 7e after masking and the tag information included in tag data field 7b of set-up register 71 after masking match with each other, CPY signal is sent from processing content determination mechanism 7 to self-synchronous transfer control circuit 3. Self-synchronous transfer control circuit 3, upon receipt of a signal of an H level at its CPY terminal, outputs two SEND pulse signals from its terminal CO and also outputs two packets. The first packet is output along with FEB signal of an L level, and the second packet is output with the FEB signal of an H level. Using this H-level FEB signal, host transfer flag 7f of data packet 7e is manipulated, and host transfer information is stored therein. Accordingly, the first packet being transferred from pipeline register 4a to pipeline register 4b has its host transfer flag at an L level, and therefore, it is subjected to a normal operation thereafter. On the contrary, the second packet has its host transfer flag 7f set to an H level, so that it is transferred to the host.

The data driven information processing apparatus of the present embodiment configured as described above has an extremely wide variety of applications. For example, masking processing units 73, 74 of processing content determination mechanism 7 may be set to extract solely instruction codes, so that all the data packets having the identical instruction codes can be transferred to the host while the program is being executed.

At this time, the program itself is not changed. Accordingly, by changing only tag data field 7b and tag mask field 7d included in set-up registers 71 and 72, respectively, it becomes possible to transfer a designated operation result of data packet 7e to the host, while continuing execution of the program, without affecting the processing speed and reproducibility of the program.

In the embodiment shown in FIG. 1, data packets matching in all of destination node number F1, generation number F2 and instruction code F3 stored in the tag field were extracted. The present embodiment shown in FIG. 6 is a variation thereof, in which data packets matching in only a given field F1–F3 stored in the tag field can be extracted to the outside. This is enabled because processing content determination mechanism 7 is provided with the tag mask field that stores information for use in extracting only necessary information for matching and with the masking processing unit that performs masking processing based on that information. For example, data packets having the identical instruction codes F3 (but different information in F1 and F2) can collectively be transferred to the outside (to the host).

Further, by changing the setting of tag data field 7b and tag mask field 7d, the degree of freedom for debugging is increased to the extent that a plurality of any desired data packets can readily be extracted at one time. In this process, the program is not changed. Also, there exists a data packet being transferred based on the tag information besides a data packet being transferred to the host by the copying function. Accordingly, it is possible to extract information about the intermediate result stored in any designated data packet to the outside, while continuing execution of the program, without affecting the processing speed and reproducibility of the program.

As having been described above, according to the first embodiment shown in FIG. 1, self-synchronous transfer control circuit 3 and processing content determination mechanism 4 manipulate host transfer flag 41f newly set within data packet 41c, thereby enabling information about the intermediate result to be readily obtained. In addition, just changing the setting of tag field 41a included in set-up register 41 allows an arbitrary data packet to be taken out of the data driven information processing apparatus (to the host) without changing the program.

As having been described above, according to the second embodiment shown in FIG. 2, self-synchronous transfer control circuit 3, processing content determination mechanism 4 and host transfer flag manipulation circuit 5 manipulate host transfer flag 41f newly set within data packet 41c, so that information about the intermediate result can readily be obtained. In addition, by creating two data packets by the copying function, one of the data packets is subjected to a normal operation according to the tag information within the data packet, while the other is forcibly taken out to the outside (to the host). Thus, it becomes possible to take out the information about the intermediate result to the outside without affecting the processing speed and reproducibility of the program. Furthermore, as in the first embodiment, it is possible to take out an arbitrary data packet to the outside (host) of the data driven information processing apparatus just by changing the setting of tag field 41a in set-up register 41, without changing the program.

As explained above, according to the present invention, a data packet consisting of a flag for determination of the processing content, a tag field and a data field is input, a determination is made whether the tag field of the data packet and a tag field pre-stored in a register have identical information, and, based on a result of the determination, processing is performed on the data packet according to the information stored in a processing content detection field within the register. Accordingly, it is possible to transfer a designated intermediate result within a program to the host without affecting processing speed and reproducibility of the program. Thus, a data driven information processing apparatus provided with an effective debug function is realized.

Further, masking processing may be performed before matching of the tag information to extract only information necessary for the matching, so that it is possible to obtain information about a plurality of data packets at one time. Accordingly, a data driven information processing apparatus provided with a more effective debug function is realized.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data driven information processing apparatus having a plurality of data transmission paths connected in series through which a data transfer request signal and a data transfer enabling signal are passed for transmission of a data packet, said data packet including a flag for determining a processing content, a tag field and a data field, the data driven information processing apparatus comprising:
a register including a processing content detection field for determining a processing content for said data packet and a tag data field; and
a processing circuit, for, when said data packet is input to said data transmission path, determining whether the tag field of said register and the tag field of said data packet have identical information, and, based on a result of the determination, performing processing on said data packet according to one of information stored in the processing content detection field of said register and information stored in the flag of said data packet.

2. The data driven information processing apparatus according to claim 1, wherein the processing performed on said data packet according to the information stored in the processing content detection field of said register includes a host transfer process for transfer of the data packet to an outside.

3. The data driven information processing apparatus according to claim 1, wherein the processing performed on said data packet according to the information stored in the processing content detection field of said register includes a host transfer process for transfer of the data packet to an outside and a normal transfer process for transfer of the data packet based on said tag information.

4. The data driven information processing apparatus according to claim 1, further comprising: a self-synchronous transfer control circuit generating two data packets with respect to the transfer request signal and outputting a manipulation signal for manipulation of host transfer flags thereof to identify said two data packets, to allow both a host transfer process for transfer of the data packet to an outside and a normal transfer process for transfer of the data packet based on said tag information.

5. The data driven information processing apparatus according to claim 2, further comprising: a self-synchronous transfer control circuit generating two data packets with respect to the transfer request signal and outputting a manipulation signal for manipulation of host transfer flags thereof to identify said two data packets, to allow both said host transfer process for transfer of the data packet to the outside and a normal transfer process for transfer of the data packet based on said tag information.

6. The data driven information processing apparatus according to claim 3, further comprising: a self-synchronous transfer control circuit generating two data packets with respect to the transfer request signal and outputting a manipulation signal for manipulation of host transfer flags thereof to identify said two data packets, to allow both said host transfer process for transfer of the data packet to the outside and said normal transfer process for transfer of the data packet based on said tag information.

7. A data driven information processing apparatus having a plurality of data transmission paths connected in series through which a data transfer request signal and a data transfer enabling signal are passed for transmission of a data packet, said data packet including a flag for determining a processing content, a tag field and a data field, the data driven information processing apparatus comprising:
a first register including a processing content detection field for determination of a processing content for said data packet and a tag data field;
a second register including a processing content detection field for determination of a processing content for said data packet and a tag mask field; and
a processing circuit, for, when said data packet is input to said data transmission path, applying masking processing to both tag data stored in the tag data field of said first register and tag data stored in the tag field of said data packet using tag mask data stored in the tag mask field of said second register, determining whether the tag field of said first register after the masking processing and the tag field of said data packet after the masking processing have identical information, and, according to a result of the determination, performing processing on said data packet according to one of information stored in the processing content detection fields of said first and second registers and information stored in the flag of said data packet.

8. The data driven information processing apparatus according to claim 7, wherein the processing performed on said data packet according to the information stored in the processing content detection fields of said first and second registers includes a host transfer process for transfer of the data packet to an outside.

9. The data driven information processing apparatus according to claim 7, wherein the processing performed on said data packet according to the information stored in the processing content detection fields of said first and second registers includes a host transfer process for transfer of the data packet to an outside and a normal transfer process for transfer of the data packet based on said tag information.

10. The data driven information processing apparatus according to claim 7, further comprising: a self-synchronous transfer control circuit generating two data packets with respect to the transfer request signal and outputting a manipulation signal for manipulation of host transfer flags thereof to identify said two data packets, to allow both a host transfer process for transfer of the data packet to an outside and a normal transfer process for transfer of the data packet based on said tag information.

11. The data driven information processing apparatus according to claim 8, further comprising: a self-synchronous transfer control circuit generating two data packets with respect to the transfer request signal and outputting a manipulation signal for manipulation of host transfer flags thereof to identify said two data packets, to allow both said host transfer process for transfer of the data packet to the outside and a normal transfer process for transfer of the data packet based on said tag information.

12. The data driven information processing apparatus according to claim 9, further comprising: a self-synchronous transfer control circuit generating two data packets with respect to the transfer request signal and outputting a manipulation signal for manipulation of host transfer flags thereof to identify said two data packets, to allow both said host transfer process for transfer of the data packet to the outside and said normal transfer process for transfer of the data packet based on said tag information.

13. A data driven information processing method for transmitting a data packet along a plurality of data transmission paths through which a data request transfer signal and a data transfer enabling signal are passed, the data packet including a processing determination flag and a tag data field, comprising the steps of:

providing a register having a tag data field and a processing instruction field;

storing tag data in the register tag data field;

associating a processing instruction with the tag data stored in the register;

comparing the tag data of a given data packet being transmitted along one of the transmission paths with the tag data stored in the register; and     if the tag data of the given data packet matches the tag data stored in the register, and the data packet processing determination flag has a predetermined value, performing the processing instruction on the given data packet.

14. The method of claim 13 wherein said step of performing the processing instruction on the given data packet includes the step of transferring the given data packet outside the data transmission path.

15. The method of claim 13 wherein said step of performing the processing instruction on the given data packet includes the step of transferring a copy of the given data packet outside the data transmission path.

16. The method of claim 13 including the additional steps of:

masking the tag data in the register; and masking the tag data of the given data packet;

wherein said step of comparing the tag data of a given data packet being transmitted along one of the transmission paths with the tag data stored in the register comprises the step of comparing the masked tag data of the given data packet with the masked tag data stored in the register.

17. The method of claim 16 wherein said step of performing the processing instruction on the given data packet includes the step of transferring the given data packet outside the data transmission path.

18. The method of claim 16 wherein said step of performing the processing instruction on the given data packet includes the step of transferring a copy of the given data packet outside the data transmission path.

* * * * *